US008082472B2

(12) United States Patent
Liu

(10) Patent No.: US 8,082,472 B2
(45) Date of Patent: Dec. 20, 2011

(54) SYSTEM AND METHOD FOR TESTING GRAPHICS CARD

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Tapei (TW)

( * ) Notice: Subject to any disclaimer, the term of this patent is extended or adjusted under 35 U.S.C. 154(b) by 94 days.

(21) Appl. No.: 12/700,569

(22) Filed: Feb. 4, 2010

(65) Prior Publication Data

US 2011/0099425 A1 Apr. 28, 2011

(30) Foreign Application Priority Data

Oct. 28, 2009 (CN) .......................... 2009 1 0308972

(51) Int. Cl.
*G06F 11/00* (2006.01)

(52) U.S. Cl. ........................................................ 714/44

(58) Field of Classification Search .............. 714/25–27, 714/29–33, 36–37, 38.1, 42–46, 48
See application file for complete search history.

(56) References Cited

U.S. PATENT DOCUMENTS

| | | | | | |
|---|---|---|---|---|---|
| 5,581,788 | A | * | 12/1996 | Ballare | 710/14 |
| 5,850,559 | A | * | 12/1998 | Angelo et al. | 713/320 |
| 5,850,562 | A | * | 12/1998 | Crump et al. | 713/1 |
| 5,881,221 | A | * | 3/1999 | Hoang et al. | 714/42 |
| 5,944,821 | A | * | 8/1999 | Angelo | 726/22 |
| 2008/0278508 | A1 | * | 11/2008 | Anderson et al. | 345/519 |
| 2011/0099425 | A1 | * | 4/2011 | Liu | 714/35 |
| 2011/0113313 | A1 | * | 5/2011 | Thiesfeld et al. | 714/807 |

* cited by examiner

*Primary Examiner* — Nadeem Iqbal
(74) *Attorney, Agent, or Firm* — Altis Law Group, Inc.

(57) ABSTRACT

A system for testing a video memory reliability of a video card includes an input module, a data read/write module, a data processing module, a data comparison module, and an output module. The input module is capable of activating a testing program which includes an original image file. The data read/write module is capable of writing the original image file in the video memory from the testing program, and reading the image file data stored in the video memory during the writing process for storing the read image file data to form a new image file. The data processing module is capable of calculating hash values of the original and new image files using hash function(s). The data comparison module is capable of comparing hash values, and outputting the comparison result. The output module is capable of indicating whether the video card is normal according to the comparison result.

6 Claims, 2 Drawing Sheets

SYSTEM AND METHOD FOR TESTING GRAPHICS CARD

BACKGROUND

1. Technical Field

The present disclosure relates to systems and methods for testing add-on cards of computers, and more particularly, to a graphics card test system and method.

2. Description of Related Art

At present, real-time three-dimensional (3D) graphics are common in computer games and by extension, a high demand for 3D graphics cards. During manufacture, the graphics cards are quality tested. One important step in that process is video memory reliability stress testing of the graphics cards. Performance thereof depends on the graphics cards' data read/write capability. Nevertheless, such conventional test methods of video memory reliability is often complex.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
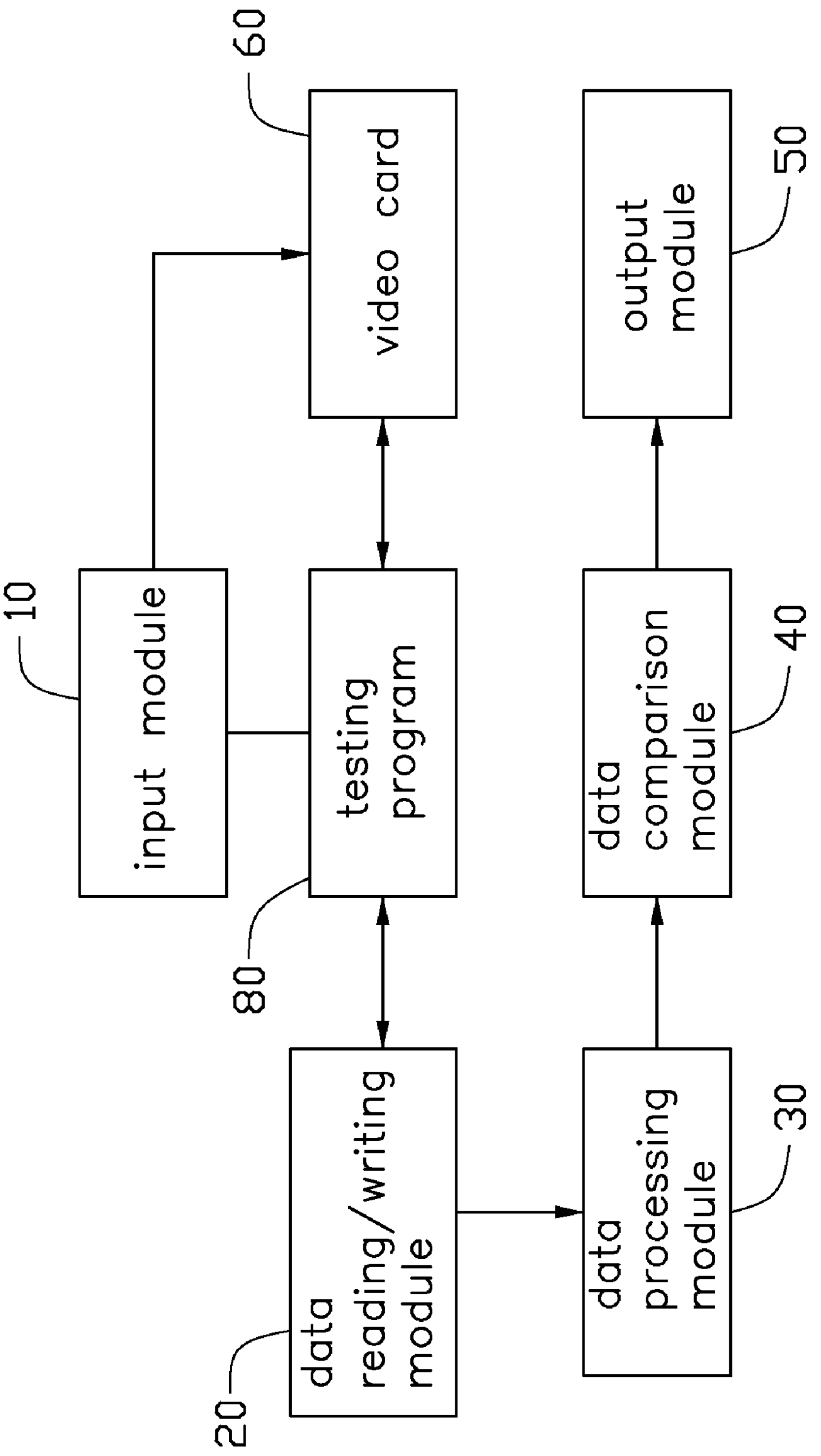
FIG. 1 is a block view of a system for testing the video memory reliability of a video card.

Referring to FIG. 1, a system for testing a video memory reliability of a video card 60 includes an input module 10, a data read/write module 20, a data processing module 30, a data comparison module 40, and an output module 50.

The input module 10 is used to initialize the video memory of the video card 60 and activate a testing program 80. The testing program 80 includes an original image file, such as bmp (or, bitmap) files. The data read/write module 20 is used to write the original image file in the video memory from the testing program 80. The data read/write module 20 reads the image file data stored in the video memory during the writing process, and stores the read image file data to form a new image file. The data processing module 30 is used to calculate hash values of the original and new image files using hash function. The data comparison module 40 is used to compare hash values of the original and new image files, and outputs a comparison result to the output module 50. The output module 50 is used to indicate whether the video card 60 is normal according to the comparison result.

Hash values of the original and new image files are calculated using MD5 arithmetic of the hash function. In cryptography, MD5 (Message-Digest algorithm 5) is a widely used cryptographic hash function with a 128-bit hash value. As an Internet standard (RFC 1321), MD5 has been employed in a wide variety of security applications, and is also commonly used to check file integrity. MD5 processes a variable-length message into a fixed-length output of 128 bits. The input message is broken up into chunks of 512-bit blocks (sixteen 32-bit little endian integers) and then padded so that its length is divisible by 512. The padding works as follows: first a single bit, 1, is appended to the end of the message. This is followed by as many zeros as are required to bring the length of the message up to 64 bits fewer than a multiple of 512. The remaining bits are filled up with a 64-bit integer representing the length of the original message, in bits.

Figure 2:
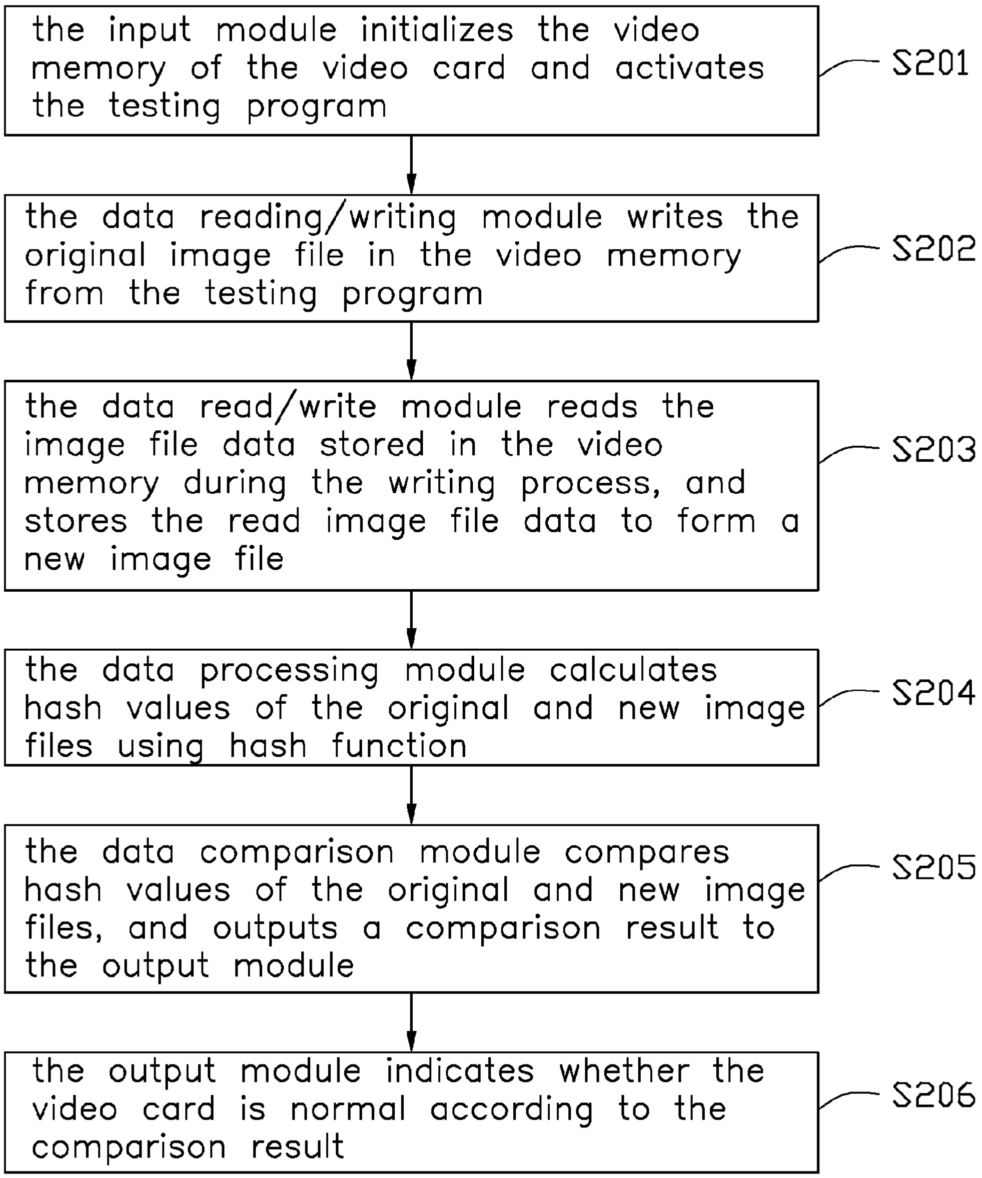
FIG. 2 is a flow view of a method for testing a video memory reliability of a video card.

Referring to FIG. 2, a method for testing the video memory reliability of the video card 60 includes following steps.

In step 201, the input module 10 initializes the video memory of the video card 60 and activates the testing program 80.

In step 202, the data read/write module 20 writes the original image file in the video memory from the testing program 80.

In step 203, the data read/write module 20 reads the image file data stored in the video memory during the writing process, and stores the read image file data to form a new image file.

In step 204, the data processing module 30 calculates hash values of the original and new image files using hash function.

In step 205, the data comparison module 40 compares hash values of the original and new image files, and outputs a comparison result to the output module 50.

In step 206, the output module 50 indicates whether the video card 60 is normal according to the comparison result. If hash value of the original image file is equal to that of the new image file, the output module 50 indicates the video card 60 is normal and/or, if the hash value of the original image file is not equal to that of the new image file, the output module 50 indicates the video card 60 is abnormal.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A system for testing a video memory reliability of a video card, comprising:

an input module capable of activating a testing program comprising an original image file;

a data read/write module capable of writing the original image file into the video memory from the testing program, reading the image file data stored in the video memory during the writing process, and storing the read image file data as a new image file;

a data processing module capable of calculating hash values of the original and new image files using MD5 (Message-Digest algorithm 5) hash function;

a data comparison module capable of comparing hash values of the original and new image files, and outputting a comparison result; and an output module capable of receiving the comparison result, and indicating whether the video card is normal according to the comparison result.

2. The system of claim 1, wherein when hash value of the original image file is equal to that of the new image file, the output module indicates the video card is normal; when hash value of the original image file is not equal to that of the new image file, the output module indicates the video card is abnormal.

3. The system of claim 1, wherein the input module is capable of initializing the video memory of the video card before activating the testing program.

4. A method for testing a video memory reliability of a video card, comprising:

activating a testing program which comprising an original image file by an input module;

writing the original image file in the video memory from the testing program by a data read/write module;

reading the image file data stored in the video memory during the writing process by the data read/write module for storing the read image file data to form a new image file;

calculating hash values of the original and new image files using MD5 (Message-Digest algorithm 5) hash function by a data processing module;

comparing hash values of the original and new image files, and outputting a comparison result by a data comparison module; and receiving the comparison result, and indicating whether the video card is normal according to the comparison result by an output module.

5. The method of claim 4, further comprising a step of initializing the video memory of the video card before activating the testing program.

6. The method of claim 4, wherein when hash value of the original image file is equal to that of the new image file, the output module indicates the video card is normal; and when hash value of the original image file is not equal to that of the new image file, the output module indicates the video card is abnormal.

* * * * *